(12) United States Patent
Miyazawa et al.

(10) Patent No.: US 6,485,864 B1
(45) Date of Patent: Nov. 26, 2002

(54) PRODUCTION PROCESS OF MATERIAL FOR LITHIUM-ION SECONDARY BATTERIES, MATERIAL OBTAINED BY THE PROCESS, AND BATTERIES

(75) Inventors: Kunio Miyazawa, Tokyo (JP); Masayasu Nagoshi, Tokyo (JP); Kenshi Noda, Tokyo (JP); Takaaki Kondo, Tokyo (JP); Tetsuo Shiode, Tokyo (JP); Hidetoshi Morotomi, Tokyo (JP); Hiromi Okamoto, Tokyo (JP); Yasuhiro Mogi, Tokyo (JP); Kazuteru Tabayashi, Tokyo (JP)

(73) Assignee: Adchemco Corporation, Tokyo (JP)

( * ) Notice: Subject to any disclaimer, the term of this patent is extended or adjusted under 35 U.S.C. 154(b) by 0 days.

(21) Appl. No.: 09/502,458

(22) Filed: Feb. 11, 2000

(30) Foreign Application Priority Data

Feb. 26, 1999 (JP) ............................................ 11-051074

(51) Int. Cl.$^7$ ............................ C01B 31/04; H01M 4/58
(52) U.S. Cl. ..................................... 429/231.8; 423/448
(58) Field of Search ................................ 423/448, 276; 429/231.8

(56) References Cited

U.S. PATENT DOCUMENTS

| | | | |
|---|---|---|---|
| 5,498,493 A | 3/1996 | Dahn et al. | |
| 5,587,256 A | 12/1996 | Wilson et al. | |
| 5,698,341 A | 12/1997 | Tamaki et al. | |
| 5,753,387 A | * 5/1998 | Takami et al. | ............... 423/448 |
| 5,910,383 A | 6/1999 | Hase et al. | |

FOREIGN PATENT DOCUMENTS

WO        WO 98/24134        6/1998

* cited by examiner

*Primary Examiner*—Wayne A. Langel
(74) *Attorney, Agent, or Firm*—Oblon, Spivak, McClelland, Maier & Neustadt, P.C.

(57) ABSTRACT

Boron-substituted graphite, which contains N-bonded boron atoms in a small proportion relative to whole substituted boron atoms, is produced by heating a feed fine particulate mixture of an infusibilized carbonaceous material and a boron compound such that the carbonaceous material is carbonized into a carbon structure, raising a temperature of the resulting heated fine particulate mixture promptly to a graphitization treatment temperature in an inert atmosphere unreactive with boron, retaining the graphitization treatment temperature for a time sufficient to allow graphitization of the carbon structure to proceed to a desired extent, and then quickly cooling the resulting graphitized mixture. The boron-substituted graphite is useful as a negative electrode in a lithium-ion secondary battery.

34 Claims, No Drawings

PRODUCTION PROCESS OF MATERIAL FOR LITHIUM-ION SECONDARY BATTERIES, MATERIAL OBTAINED BY THE PROCESS, AND BATTERIES

BACKGROUND OF THE INVENTION a) Field of the Invention

This invention relates to processes for the production of carbonaceous materials having high performance as negative-electrode materials, and especially to processes for the production of boron-substituted graphite, silicon-containing boron-substituted graphite and silicon-containing carbonaceous materials for lithium-ion secondary (rechargeable) batteries. This invention is also concerned with the boron-substituted graphite, silicon-containing boron-substituted graphite and silicon-containing carbonaceous materials obtained by the processes. This invention also pertains to lithium-ion secondary batteries making use of the boron-substituted graphite, silicon-containing boron-substituted graphite and silicon-containing carbonaceous materials as materials of negative electrodes.

b) Description of the Related Art

Recent years have seen rapid advancements in the size and weight reductions of electronic equipments and communication equipments, resulting in a strong demand for reductions in size and weight of secondary batteries used as drive power sources for them. Keeping in step with this, lithium-ion secondary batteries with high energy density and high voltage have been proposed. A lithium-ion secondary battery uses, for example, lithium cobaltate as a positive electrode and a carbonaceous material, such as graphite, as a negative electrode. Upon charging, lithium ions are caused to be occluded in the negative electrode, and upon discharging, these lithium ions are emitted from the negative electrode.

Employed as such negative-electrode materials are those available from carbonization or graphitization of carbonaceous raw materials or resins, such as MCMB (meso carbon microbeads) and fine particles of mesophase pitch, derived from petroleum pitch or coal tar pitch. However, dis-charge capacities available from these negative-electrode materials are not sufficiently high as batteries and moreover, initial efficiencies are not very high, either.

With a view to overcoming these problems, a variety of investigations have been made about boron-added carbonaceous materials. In 1992, J. R. Dahn et al. studied, as a host material for lithium intercalate, boron-substituted graphite which was obtained by adding, to artificial graphite, boron oxide in a proportion of about 8 wt. % in terms of boron and then conducting graphitization in a nitrogen gas atmosphere [Phys. Rev. B. 45(7), 3773 (1992)]. In this publication, however, properties or characteristics as an actual battery, such as dis-charge capacity and initial efficiency, are not disclosed.

The teaching of JP 5-266,880 A is only to conduct graphitization by simply adding boron to an organic substance as a raw material for graphite instead of the addition of boron oxide to artificial graphite as disclosed in the technical bulletin referred to in the above. The teaching of this patent publication is therefore not different at all from that of the technical bulletin.

In JP 8-31422 A and JP 9-63584 A, for example, the raw material for graphite to be produced is limited to pitch, or the graphitization temperature is limited to prevent an increase in the particle size of graphite. With these conditions alone, it is impossible to obtain a carbonaceous material optimal as a negative-electrode material for lithium-ion batteries. Further, JP 8-31422 A indicates that, when the thus-obtained carbonaceous material is used as a negative material in a battery, boron carbide remaining in the carbonaceous material leads to a reduction in the charge capacity of the battery. As a measure for dis-problem, this patent publication discloses merely to control the amount of a boron compound to be added. The carbonaceous material is likewise not considered to be optimal as a negative-electrode material for lithium-ion batteries.

Concerning industrial production of such boron-substituted graphite, JP 10-162829 A discloses that, after graphitization of a carbonaceous material is conducted in a nitrogen gas atmosphere, boron nitride formed in a surface layer is decreased by treating the graphitized carbonaceous material at 2,000° C. or higher under reduced pressure or subjecting it to halogen treatment.

From the standpoint of industrial production of a negative-electrode material, however, the inclusion of such treatment requires more complex production facilities and higher cost. To cope with this problem, JP 10-255799 A discloses to disperse a boron compound in softened or molten pitch so that the boron compound can be prevented from coming into contact with the nitrogen gas atmosphere. It is however very difficult to completely encapsulate the boron compound with the pitch. Effects of this proposal are therefore suspicious. Except for the above patent publications, there is no technical bulletin or patent publication that makes mention about an atmosphere gas to be employed upon graphitization of a carbonaceous material. Even in most of the above patent publications referred to in the above, nothing is disclosed beyond graphitization of a carbonaceous material "in an inert atmosphere".

Carbonaceous materials, which can be obtained by either substituting boron for or adding boron to these boron-substituted graphites, are disclosed in JP 3-245458 A. As this patent publication discloses only treatments up to carbonization, the carbonaceous materials disclosed there are totally different from the previously-mentioned boron-substituted graphites in which portions of graphite carbons were replaced by boron.

Further, JP 7-73898 A discloses as a carbonaceous material graphite or amorphous graphite in which boron has substituted for a portion of carbon atoms. This carbonaceous material is however considerably different from the previously-mentioned boron-substituted graphite in which boron has substituted for a portion of carbon in the graphite, because its graphite layer spacing ($d_{002}$) as determined by X-ray diffraction is 0.337 nm or greater and in addition, its use as a negative-electrode material in a battery provides a charge-discharge curve different from that available from a battery making use of a carbonaceous material.

As is disclosed inter alia in JP 7-73898 A and JP 6-333601, these boron-substituted or boron-added carbonaceous materials are synthesized by CVD processes each of which makes use of a mixed gas of a boron source gas and a carbon source gas. When industrial production is intended, these processes have no practical utility in cost.

In addition to boron-added carbonaceous materials, a variety of investigations have also been made about silicon-added carbonaceous materials. Silicon is known to be alloyed with lithium atoms, and as a specific capacity, approximately 4,017 mAh/g is achieved. However, these silicon-lithium alloys have large irreversible capacity, and due to expansion in volume resulting from the alloying, they involve a problem in stability.

To resolve this problem, JP 7-315822 A is proposing a material with atoms of an element capable of forming an alloy, such as silicon, incorporated in graphitized carbon as a host material without modification to the structure of an intact region in the host material. To product such a material, however, a costly synthetic process such as CVD is needed. Further, due to the insertion of silicon in carbon on the order of atoms, no improvements have been made yet as to the problem of large irreversible capacity in batteries.

Carbonaceous materials with boron and silicon mixed therein are disclosed, for example, in PCT International Publication WO 98/24134 and JP 11-40158 A. These carbonaceous materials are obtained by adding boron and silicon to the carbonaceous materials and then graphitizing the resulting mixture, and are not improved substantially in dis-charge capacity.

SUMMARY OF THE INVENTION

An object of the present invention is therefore to industrially provide boron-substituted graphite and a silicon-containing carbonaceous material which, when used in lithium-ion secondary batteries, can produce constant discharge potential while assuring higher energy density and higher service capacity than the conventional carbonaceous materials.

To achieve the above-described object, the present invention provides a process for the production of boron-substituted graphite for lithium-ion secondary batteries, said boron-substituted graphite containing N-bonded boron atoms in a small proportion relative to whole substituted boron atoms, which comprises heating a feed fine particulate mixture of an infusibilized carbonaceous material and a boron compound such that the carbonaceous material is carbonized into a carbon structure, raising a temperature of the resulting heated fine particulate mixture promptly to a graphitization treatment temperature in an inert atmosphere unreactive with boron, retaining the graphitization treatment temperature for a time sufficient to allow graphitization of the carbon structure to proceed to a desired extent, and quickly cooling the resulting graphitized mixture; boron-substituted graphite produced by the above process; and a lithium-ion secondary battery comprising a negative electrode made of the boron-substituted graphite.

The present invention also provides a process for the production of a silicon-containing carbonaceous material for lithium-ion secondary batteries, which comprises adding, to highly-crystalline graphite selected from a graphitized material of a carbonaceous material or natural graphite, silicon or a silicon compound such that said silicon or silicon compound amounts to 0.1 to 30 wt. % of the whole resulting mixture in terms of silicon, and subjecting said resulting mixture to heat treatment as 350 to 1,500° C.; a silicon-containing carbonaceous material produced by the above process; and a lithium-ion secondary battery comprising a negative electrode made of the boron-substituted graphite.

Use of the boron-substituted graphite or silicon-containing carbonaceous material, which is available from the present invention, as a negative-electrode material in a lithium-ion secondary battery makes it possible to provide the lithium-ion secondary battery with a constant discharge level characteristic, excellent cycling characteristic, and higher energy density and higher service capacity than the conventional carbonaceous materials.

DETAILED DESCRIPTION OF THE INVENTION AND PREFERRED EMBODIMENTS

Firstly, the present invention will be discussed from a theoretical standpoint. It should however be borne in mind that the present invention is by no means limited by or to the following theoretical discussion.

As a process commonly usable for obtaining boron-substituted graphite, it is most convenient to graphitize a carbonaceous material in the presence of a boron compound as proposed y C. E. Lowell in Journal of The American Ceramic Society, 50(3), 142 (1967). Upon practicing this process, mixing of the boron compound and the carbonaceous material into a homogeneous mixture is important for evenly substituting boron for a portion of the carbon atoms in the carbonaceous material. To achieve this, some methods can be contemplated, including making smaller the particle size of a boron compound to be mixed or adding and mixing a boron compound in a liquid form. About specific methods for evenly mixing a boron compound in a carbonaceous material, a detained description will be made subsequently herein.

The boron material to be added to the carbonaceous material can be in any chemical form, including boron element, inorganic boron compounds such as boric acid, boron oxide and boron carbide, and organic boron compounds. Preferred as the carbonaceous material, however, is one having good wetting property for the boron compound to be added, permitting easy formation of boron carbide, and also having high graphitizability. As a rationale for the requirement of such a carbonaceous material, the substitution of boron for carbon and the conversion of carbon into a solid solution with boron is believed to proceed as will be described hereinafter.

As a mixture of a carbonaceous material and a boron compound is heated and raised in temperature in an atmosphere unreactive with boron, they first act each other and form boron carbide irrespective of the form of the boron compound so added. At this time, the reaction velocity of the formation of boron carbide considerably varies depending on the nature of the carbonations material employed as a raw material. The carbonaceous material to be used, therefore, may preferably be one having good wetting property to the boron compound and permitting easy formation of the carbide of boron. At each interface of boron carbide so formed, there is a region where a solid solution of carbon and boron, said solid solution being represented by $B_4C_{1-x}$ ($0<x<0.65$), is formed. From this region, boron spreads into a carbon structure while forming a solid solution. Owing to this spreading in the form of the solid solution, resulting graphite crystals are rendered free of distortion and as a consequence, boron-substituted graphite with a well-developed graphite structure is formed.

For the above-described development of the graphite structure, the carbonaceous material employed as a raw material is required to be a readily-graphitizable material. The present inventors conducted an extensive investigation with a view to finding a starting carbonaceous material which has a high reaction velocity for the formation of boron carbide and also has high graphitizability. As a result, high softening-point pitch with optically isotropic portions contained therein was found to be most suitable.

To allow the above-described graphitization to proceed by the substitution of boron for carbon and the formation of carbon into a solid solution with boron and hence to produce homogeneous boron-substituted graphite, the atmosphere gas upon conducting graphitization is of first importance. In this regards, it is proposed in JP 10-162829 A to conduct graphitization in a nitrogen gas atmosphere from the viewpoint of cost. This patent publication however discloses to the effect that as a result, the boron compound and nitrogen in the atmosphere react and form boron nitride and further that the existence of this boron nitride becomes a sole cause for deteriorated battery properties or characteristics when the resultant graphite is used as a negative-electrode material in a battery.

However, the present inventors have found that the existence of boron nitride so formed is not a sole problem but that the reaction for the formation of boron nitride in the course of graphitization interferes with the above-mentioned spreading of boron into a carbon structure while forming a solid solution and thus renders the above-described reaction for the formation of boron nitride fail to form a homogeneous boron-substituted graphite. This has led to a further finding that there is a need to set the graphitization temperature at 2,200° C. or higher upon graphitization of a carbonaceous material and also to use, as an atmosphere gas upon conducting the graphitization, an inert atmosphere which does not undergo a reaction with boron during the graphitizing reaction as will be described subsequently herein.

The ramp-up time to a temperature at which a carbonaceous material is graphitized, the graphitization temperature and its retention time, and the cooling time after the graphitization vary depending on the type of the apparatus, the amount of a boron compound added, etc. In general, however, the carbonaceous material may be heated to a graphitization temperature in 100 hours, and the graphitization temperature and its retention time may be set at 2,200° C. or higher and in a range of from 0.1 to 48 hours. Subsequent cooling from the graphitization temperature to 100° C. in 100 hours can bring about desired results. Incidentally, a temperature of 2,400° C. or higher causes melting of the boron compound (e.g., boron carbide), which is added first in this graphitization, or of the resulting boron carbide, leading to graphite with an increased particle size. To avoid this problem, it is preferred to add highly-crystalline graphite which has such effectiveness as somewhat lowering the bulk density upon graphitization.

The above-described cooling rate is very important from the standpoint that boron spread as a solid solution in such a carbon structure is allowed to reprecipitate in a minimized amount as $B_4C$ on the surfaces of the resulting fine graphite particles and moreover, the reprecipitatation of such $B_4C$ takes place with as small a particle size as possible, because, when graphite is used as a negative-electrode material in a lithium-ion secondary battery, $B_4C$ in the graphite does not contribute to the reversible occlusion of lithium ions and on the contrary, increases an irreversible capacity and reduces the conductivity of the graphite.

The amount of $B_4C$ precipitated on the surfaces of the fine graphite particles can be determined by XPS. As a negative-electrode material for lithium-ion secondary batteries, a boron $1_s$ spectrum is required to include around 186 eV a B $1_s$ peak ascribed to substituted solid-solution boron and moreover, a percentage of boron determined from an intensity ratio of a B $1_s$ peak appearing around 188 eV and ascribed to boron of $B_4C$ is needed to account for 5 atom % or less of surface layer elements as detected by XPS. These conditions can be met by controlling the cooling rate as described above.

On the other hand, the silicon-containing carbonaceous material is produced by adding silicon or a silicon compound to highly-crystalline graphite, which is selected from a graphitized product of a carbonaceous material and/or natural graphite, or boron-substituted graphite according to this invention and then subjecting the resulting mixture to heat treatment at 350 to 1,500° C. in an inert atmosphere, reducing atmosphere or slightly-oxidizing atmosphere. By this heat treatment, compounds of carbon, silicon, boron and oxygen are formed, and the resulting silicon-containing carbonaceous material therefore shows low irreversible capacity and large service capacity, both of which are so good that they would not be expectable if only single crystals were used. No specific reason, however, has been elucidated yet for this unexpected result.

Preferred embodiments of the process according to the present invention for the production of boron-substituted graphite will next be described in the order of its steps. A description will also be made about the production process of a silicon-containing carbonaceous material.

1. Production Process of Boron-substituted Graphite a. Step in Which a Boron Compound is Added to and Mixed with a Carbonaceous Material and the Resulting Mixture is Subjected to Heat Treatment After the boron compound is added to and dispersed in feed pitch, the resulting mixture was subjected to heat treatment such that the feed pitch is converted into high softening-point pitch. This high-softening-point pitch contains 5 to 98 vol. %, preferably 10 to 95 vol. % of optically isotropic portions having strong reducing power to the boron compound, and has a softening point of 250° C. or higher. The boron compound, which is to be dispersed in the feed pitch, may be either in a liquid form or in a solid form. When it is in a solid form, one having a smaller particle size is preferred because it disperses evenly in the pitch. For example, use of fine particles the average particle size of which is 50 µm or smaller is preferred.

Concerning the amount of the boron compound to be added to the feed pitch, the boron compound can be added in an amount such that the proportion of the boron compound ranges from 0.1 to 7 wt. %, preferably from 1 to 5 wt. % in terms of boron based on the high softening-point pitch to be formed subsequent to the heat treatment. If the proportion of the boron compound so added is lower than 0.1 wt. % in terms of boron, the added boron compound is caused to evaporate in the subsequent graphitization treatment step so that boron-substituted graphite is not formed sufficiently. If the proportion of the boron compound so added is higher than 7 wt. % in terms of boron, on the other hand, $B_4C$ which does not spread as a solid solution into the resulting graphite is formed excessively, and due to the inclusion of this $B_4C$, the resulting graphite is lower in battery properties or characteristics. Amounts of the boron compound outside the above range are therefore not appropriate.

The feed pitch employed as described above is a fraction which is left after coal tar, from which light fractions have been eliminated by atmospheric distillation, is subjected further to vacuum distillation. One having a softening point of from 110 to 115° C. is preferred. Pitch the softening point of which is lower than 100° C. contains lots of substances which undergo thermal decomposition when the pitch is subjected to heat treatment subsequent to the addition of the boron compound, thereby developing inconvenience such that a longer time is required for the heat treatment. On the other hand, a feed pitch having a softening point higher than 115° C. is not preferred, because in an initial stage of the heat treatment subsequent to the addition of the boron compound, its viscosity is high and the dispersion of the boron compound so added cannot be fully achieved within the heat treatment time.

The pitch with the boron compound contained therein is subjected to the heat treatment at 420° C. or lower, preferably 380 to 400° C. During this heat treatment, the molten pitch is agitated mechanically or bubbling nitrogen gas from a bottom part of a reactor through plural nozzles. This makes it possible to keep uniform the temperature of the molten pitch, to prevent the pitch component from concentrating on any particular part, and also to assure dispersion of the boron compound.

It is preferred to conduct the above-mentioned heat treatment by setting conditions, such as heating temperature, heating time and pressure, such that the softening point of the heat-treated product becomes 250° C. or higher, preferably falls in a range of from 330 to 370 C. If the softening point of the heat-treated product is lower than 250° C., the fine particles soften and fuse and cannot retain their shapes upon infusibilization treatment by oxidation, said infusibilization treatment (hereinafter called "oxidation treatment") being a step to be conducted subsequent to pulverization of the heat-treated product. If the softening point of the heat-treated product exceeds 370° C., handling such as draw-off of the heat-treated product from the vessel after the heat treatment becomes difficult, and/or by pulverization as next step, fine particles are obtained with a greater aspect ratio. Softening points outside the above range are therefore not preferred.

The addition of the boron compound to the feed pitch in the above-described manner makes it possible to form high softening-point pitch, which contains 5 to 98 vol. % of optically isotropic portions having strong reducing power to the boron compound and shows high graphitizability, because by the addition of the boron compound, the viscosity of the resulting mixture under the heat treatment increases to inhibit joining of mesophase portions as optically anisotropic structures.

Such optically isotropic portions in the high softening-point pitch have good wetting property to the added boron compound, can easily form the carbide of boron, and also has a high formation rate of boron-substituted graphite. If the proportion of these optically isotropic portions is lower than 5 vol. %, the overall formation rate of boron-substituted graphite becomes slower. If the proportion of these optically isotropic portions is higher than 98 vol. %, on the other hand, the graphitizability is deteriorated.

In a further preferred embodiment of the present invention, the above-described boron compound can be evenly dusted on highly-crystalline graphite, for example, on natural graphite (flaky) or artificial graphite the particle size of which is very small, and the graphite with the boron compound dusted thereon can then be mixed in high softening-point pitch which contains 5 to 98 vol. % of optically isotropic portions. This makes it possible to allow the boron compound to spread more evenly into the pitch, and further, the highly-crystalline graphite promotes the graphitization of the carbonaceous material as the raw material.

To have the boron compound evenly dusted on the highly-crystalline graphite, fine particles of the highly-crystalline graphite are evenly dispersed in a solution of the boron compound, for example, boric acid, boron oxide or the like in a solvent capable of exhibiting wetting property to graphite, such as ethanol or a liquid organoboron compound, and organic substances such as the solvent are then eliminated by processing such as drying under reduced pressure or thermal decomposition, whereby fine particles of highly-crystalline graphite, said fine particles carrying the boron compound evenly spread and dusted thereon, can be obtained. Concerning the proportions of the highly-crystalline graphite and boron compound to be used upon conducting the dusting, it is preferred that the boron compound amounts to 0.1 to 70 wt. % in terms of boron element of the total weight of both materials.

Upon mixing the resulting mixture of the highly-crystalline graphite and the boron compound in the high softening-point pitch in which the optically isotropic portions are contained in the proportion of from 5 to 98 vol. %, the amount of the mixture, similarly to the above-described case, may range from 0.1 to 7 wt. %, preferably from 1 to 5 wt. % in terms of boron on the basis of the high softening-point pitch. The mixing of the highly-crystalline graphite, on which the boron compound is evenly spread and dusted, with the high melting-point pitch may be effected by adding the former to the latter upon subjecting the feed pitch to heat treatment, kneading both of them under heat in a kneader or the like, or mixing both of them as fine particles in a ball mill or the like.

Upon adding the boron compound to the feed carbonaceous material in the present invention, it is preferred, as described above, to evenly disperse the boron compound in high softening-point pitch, said pitch containing 5 to 98 vol. % of optically isotropic portions having strong reducing power to the boron compound, to form the resulting mixture into fine particles and then to use the fine particles as a raw material for graphitization.

b. Pulverization Step of the Heat-treated Product

The heat-treated product obtained as described above is next pulverized such that the resulting fine particles have particle sizes under 200 mesh. The average particle size is 50 $\mu$m or smaller, with a range of from 5 to 30 $\mu$m being preferred. No particular limitation is imposed on the grinding or milling machine, and a grinding or milling machine such as a jet mill, a ball mill, an agitation mill or a high-speed rotary mill can be used.

c. Oxidation Treatment

The fine particles are then subjected to oxidation treatment to insolubilize them. This treatment is necessary to avoid fusion and cohesion of the fine particles during the subsequent carbonizing and carbide-forming step and graphitization step. This oxidation treatment may preferably be conducted in an oxidizing furnace or kiln at an oxygen concentration of from 16 to 18 wt. % or so while causing nitrogen gas to flow through the oxidizing furnace or kiln, although the oxidation treatment may be conducted at a temperature of from 140 to 300° C. in air. To prevent the fine particles from fusing and cohering together into aggregates, it is preferred, upon oxidation, to divide the oxidizing furnace or kiln into a multiplicity of sections to permit precise temperature control; or for keep the fine particles out of contact with a heat source, to treat the fine particles in a fluidized bed or to effect in the form of a thin layer the flow of the fine particles through the oxidizing furnace or kiln. Although some fusion-cohered aggregates occur by this oxidation treatment, these fusion-cohered aggregates can be reused provided that they are pulverized again.

Concerning the degree of oxidation in this oxidation treatment, it is desired to set oxidation conditions such that the oxidized product contains about 2 to 10 wt. % of oxygen. A proportion of oxygen lower than the above range, in other words, insufficient oxidation is not preferred in that fusion and cohesion of fine particles takes place in the subsequent carbonization treatment. Excessive oxidation, on the other hand, is not preferred in that the specific surface area of the fine particles increases or the non-crystallinity of the fine particles increases.

The fine particles, which have been subjected to the oxidation treatment as described above, are somewhat rounded without sharp corners which the fine particles had before the oxidation treatment, and, although the resulting fine particles may not be described to such an extent as being spherical, they have been converted into somewhat rounded fine particles and their aspect ratio falls within a range of from 1 to 2.

d. Carbonization Step

Finally, carbonizing and carbide-forming treatment of the fine particles is conducted by a method known per se in the art. This carbonization treatment is conducted at 600 to 1,200° C. As the treatment time, a suitable time should be selected depending on the facilities. Further, as an example of the atmosphere during the carbonization, a reducing gas can be mentioned. In principle, any inert atmosphere can be used without problems insofar as carbon is not oxidized there. This carbonization treatment can also be conducted continuously, and as various conditions and facilities for the carbonization, a variety of various conditions and facilities known to date can be used as are.

d'. Treatment for the Prevention of Fusion and Cohesion of the Fine Particles

To prevent the fine particles from fusing and cohering during graphitization which is a next step, fine particles of highly-crystalline graphite are added and mixed with the above-mentioned oxidized product or carbonized product such that the fine particles of the highly-crystalline graphite amount to 0.5 to 30 wt. % of the whole amount of the resulting mixture. As these fine particles of the highly-crystalline graphite, it is preferred to use one having an average particle size of from 0.1 to 10 μm. One having an average particle size smaller than 0.1 μm is not economical because it requires special pulverization. One having an average particle size greater than 10 μm, on the other hand, is not effective for the prevention of fusion and cohesion. The mixing can be performed by a conventional method, for example, in a V-type blender or Henschel mixer.

e. Graphitization Step

Graphitization of the fine particles is conducted by heating the fine particles to a graphitization temperature in 100 hours in an inert atmosphere unreactive with boron, and, after graphitization at 2,200° C. or higher, cooling the graphitized fine particles to 100° C. from the graphitization temperature in 100 hours. The inert gas unreactive with boron can be a rare gas, such as helium or argon, or a gas composed of such a rare gas and containing nitrogen to such an extent as not causing nitrifing of boron. Use of a gas other than these boron-unreactive gases results not only in inclusion of a boron compound, which is to be formed through a reaction with the gas, in the boron-substituted graphite to be obtained finally but also in inhibition of spreading of boron as a solid solution into graphite.

Concerning the graphitization temperature, graphitizability is known to be improved further in general as the graphitization temperature rises. It is suitable to set the graphitization temperature at 2,200° C. or higher where boron spreads at a high rate as a solid solution into the carbon structure. On the other hand, the retention time of the graphitization temperature may be 0 to 48 hours, preferably 1 to 12 hours. If the retention time of this temperature is too short, for example, 0 hour, the graphitization is not allowed to proceed to any sufficient extent. If the retention time exceeds 48 hours, the added boron and the boron, which have already spread as the solid solution, undergo evaporation. Retention time outside the above range is therefore not suited. During this graphitization time, evaporation of the boron compound, conversion of the boron compound into boron carbide, and spreading of boron as a solid solution into graphite take place.

To produce boron-substituted graphite optimal as a negative-electrode material for lithium-ion secondary batteries, the cooling rate from the graphitization temperature to 100° C. is important. Use of a higher cooling rate makes it possible to allow boron, which has spread as a solid solution, to reprecipitate in a smaller amount as $B_4C$ on graphite surfaces and moreover, makes the reprecipitatation of such $B_4C$ take place with a smaller particle size. If the cooling to the temperature of 100° C. is conducted taking more than 100 hours, $B_4C$ precipitates in a greater amount and moreover, with a greater particle size, leading to an increase in irreversible capacity when employed as a negative-electrode material in a lithium-ion secondary battery. Cooling rates outside the above range are therefore not preferred.

As industrial graphitization furnaces or kilns, Acheson furnaces are primarily used these days. With furnaces of this type, however, control of the atmosphere, cooling rate and the like is difficult. They are hence not suited for the production of boron-substituted graphite having good battery properties or characteristics. To meet the above-described conditions, a continuous graphitization furnace of such a design that graphite crucibles with fine particles placed therein are continuously fed into the graphitization furnace and are then cooled or a continuous graphitization furnace of the kiln type or the shaft type which permits continuous charging of fine particles is most suitable. It is however not necessary to use a furnace or kiln of such a design insofar as graphitization conditions such as those described above can be assured.

[Various Physical Property Values of Boron-substituted Graphite]

The boron-substituted graphite according to the present invention obtained as described above is in the form of highly-crystalline boron-substituted fine graphite particles, which have a graphite layer spacing ($d_{002}$) of 0.337 nm or smaller, a crystalline size ($L_c$) of 30 nm or greater in the direction of c-axis, and a crystalline size ($L_a$) of 40 nm or greater in the direction of a-axis. Further, a boron $1_s$ spectrum as measured by XPS includes around 186 eV a B $1_s$ peak ascribed to substituted boron in the form of a solid solution, and the percentage of boron determined from an intensity ratio of a B 1s peak appearing around 188 eV and ascribed to boron of $B_4C$ accounts for 5 atom % or less of surface layer elements as detected by XPS.

Further, the percentage of nitrogen-bonded boron, a peak of which appears around 190 eV in the boron $1_s$ spectrum as measured by XPS may preferably account for 10 atom % or less of the surface layer elements as detected by XPS. It is also preferred that, when binding energy of a gold $4f_{7/2}$ peak is assumed to be 84.0 eV, a carbon $1_s$ peak of graphite in the carbon 1s spectrum as measured by XPS is smaller in binding energy than 284.3 eV and appears around 282.5 eV.

Preferably, the boron-substituted graphite contains boron in a proportion of from 0.01 to 5 wt. %, more preferably in a proportion of from 0.5 to 3 wt. %, both in terms of boron element, and is in the form of very fine particles having a specific surface area of 2.0 $m^2/g$ or smaller. When such boron-substituted graphite is used as a negative-electrode material in lithium-ion secondary batteries, the resulting batteries have low reactivity with an electrolytic solution and a relatively small irreversible capacity.

[Measurement of XPS]

Measurement of XPS is performed as will be described hereinafter. Graphite powder is fixed on a sample holder for XPS analysis without touching it with a bare hand. As an illustrative fixing method, the graphite powder may be filled in a recess of a holder or may be lightly compression-bonded onto a soft metal such as indium. The holder is next brought into an analysis chamber to conduct a measurement. Before the measurement, the sample should not be subjected to any surface treatment (such as washing with an organic solvent or ion sputtering). The measurement is conducted in accordance with general XPS measurement procedures [see, for example, "X-ray Photoelectron Spectroscopy", Maruzen Co., Ltd. (1998)]. No particular limitation is imposed on the X-ray source. Binding energy is calibrated using a standard sample. In the present invention, gold was used, and the binding energy of a gold $4f_{7/2}$ peak was set at 84.0 eV. Errors in binding energy in an analyzer are not greater than +0.05 eV. Levels of binding energies are considered to fall within a dispersion range of +0.5 eV although the dispersion range varies depending on the analyzer maker. It is therefore easy to distinguish the three states of boron, namely, solid-solution boron, boron carbide and boron nitride in a boron $1_s$ spectrum.

To calculate the elemental composition of a surface layer, on the other hand, the integrated intensities of peaks appeared in the boron $1_s$ spectrum are first calculated. A peak may appear in an asymmetrical form in some instances, and in such a case, its integrated intensity should be calculated by also taking the asymmetry into consideration. As a method for determining the integrated intensities of peaks of boron, it is popular, but not limited, to define the peaks of solid-solution boron, boron carbide and boron nitride components by Gaussian functions, Lorentz functions or the like and then fitting a found spectrum to the thus-defined peaks. To calculate the composition of the surface layer, relative sensitivity coefficients associated with the analyzer are used. In the present invention, calculations were made using the following relative sensitivity coefficients—carbon $1_s$: 1.00, boron $1_s$: 0.486, nitrogen $1_s$: 1.80, and oxygen $1_s$: 2.93. When no particular elements other than those mentioned here have been added to graphite, it is sufficient to conduct quantitative calculations on these four elements only. When some graphite particles are coated with an element or compound other than those mentioned above, the thickness of the coating layer should be taken into consideration.

2. Production Process of Silicon-containing Carbonaceous Material

A silicon-containing carbonaceous material is produced by adding silicon or a silicon compound to highly-crystalline graphite, which is selected from a graphitized product of a carbonaceous material and/or natural graphite, or the above-described boron-substituted graphite of the present invention such that the silicon or silicon compound amounts to 0.1 to 30 wt. % of the whole resulting mixture, and then subjecting the mixture to heat treatment at 350 to 1,500° C. in an inert atmosphere, reducing atmosphere or slightly oxidizing atmosphere. Examples of the carbonaceous material useful in this process can include highly-crystalline graphites such as those obtained by carbonizing or graphitizing thermosetting resins, such as phenol resins and furan resins, or coal or petroleum pitch, natural graphite, graphite formed as a decomposition product upon production of Sic, and kish graphite; and carbonaceous materials such as the boron-substituted graphite of the present invention.

On the other hand, illustrative of the silicon or the silicon compound are monocrystalline silicon, polycrystalline silicon, amorphous silicon, and silicon oxide. The mixing of the carbonaceous material with the silicon or silicon compound can be conducted in a manner known per se, for example, in a V-type blender or Henschel mixer. The silicon or silicon compound may be added in an amount of from 0.1 to 30 wt. % in terms of silicon element on the basis of the resulting mixture. If the amount is less than 0.1 wt. %, the effects of silicon are not exhibited. If the amount is greater than 30 wt. %, the resulting silicon-containing carbonaceous material has a very large irreversible capacity.

[Applications to Batteries]

A description will next be made of applications of the boron-substituted graphite and silicon-containing carbonaceous material to lithium-ion secondary batteries. Each active material, which makes up its corresponding electrode plate, is formed from an electrode coating formulation composed at least of the active material and a binder. By using as a negative-electrode active material the above-described boron-substituted graphite or silicon-containing carbonaceous material of this invention and also using as a positive-electrode active material, for example, one or a combination of plural compounds out of lithium oxides such as $LiCoO_2$ and $LiMn_2O_4$ and chalcogen compounds such as $TiS_2$, $MnO_2$, $MoO_3$ and $V_2O_5$, a lithium-ion secondary battery capable of producing a service voltage as high as 4 volts can be obtained. It is preferred to evenly disperse these active materials in the resulting coating formulations, respectively. For this purpose, it is preferred to use, as each of positive and negative active materials, fine particles having particle sizes in a range of from 1 to 100 µm and an average particle size of from 5 to 40 µm or so, more preferably from 10 to 25 µm or so.

As the binder in each active material layer, a binder can be selected as desired, for example, from thermoplastic resins, specifically polyester resins, polyamide resins, polyacrylate ester resins, polycarbonate resins, polyurethane resins, cellulose resins, polyolefin resins, polyvinyl resins, fluorinated resins, polyimide resins and the like; and can then be used.

Each active material which makes up its corresponding electrode plate can be prepared in a manner as will hereinafter be described. Firstly, the binder selected as desired from the above-described materials and the fine particulate active material are kneaded or are dispersed and dissolved by using a suitable dispersant, whereby an electrode coating formulation is prepared. Using the coating formulation so obtained, a charge collector is then coated. As a coating method, gravure, gravure reverse, die coating, slide coating or the like is used. After that, through a drying step in which the coating formulation so applied is dried, an active layer of a desired thickness is formed. In this manner, positive and negative electrode plates are obtained.

As the charge collectors used for the electrode plates, metal foils such as aluminum or copper foils can be used preferably. These metal foils are about 10 to 30 µm in thickness. Upon fabricating a lithium-ion secondary battery by using the positive and negative electrode plates prepared as described above, a non-aqueous electrolytic solution with a lithium salt dissolved as a solute in an organic solvent is used as an electrolytic solution. Examples of organic solvents usable here can include cyclic esters, linear esters, cyclic ethers, chain ethers, and the like. For example, propylene carbonate or the like can be mentioned as a cyclic ester, tetrahydrofuran or the like can be mentioned as a cyclic ether, and 1,2-dimethoxyethane or the like can be mentioned as a linear ether.

Examples of the solute, i.e., the lithium salt, which together with the organic solvent forms the non-aqueous electrolytic solution, can include inorganic lithium salts such as $LiClO_4$, $LiBF_4$, $LiPF_6$, $LiCl$ and $LiBr$, and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$ and $LiOSO_2C_7F_{15}$.

The present invention will next be described specifically by Examples and Comparative Examples.

EXAMPLE 1

To vacuum residue pitch of 105° C. in softening point, boron carbide the average particle size of which was 14 μm was added in an amount of 3 wt. % in terms of boron. The resulting mixture was heat-treated at 400° C. for 5 hours while bubbling 17 Nm³/kg-pitch of nitrogen gas at a pressure of 5 kg/cm².G, whereby high softening-point pitch containing 38 vol. % of optically isotropic structures and a softening point of 365° C. was obtained. The pitch was drawn off from the reactor and was then cooled and solidified. The high softening-point pitch was pulverized into fine particles the average particle size of which was 23 μm. The fine particles were heated in an air stream at a ramp-up rate of 2° C./min from 130° C. to 260° C., at which the fine particles were maintained for 20 minutes to conduct oxidation treatment.

The fine particles were then heated to 800° C. at a ramp-up rate of 50° C./hr in the course of 24 hours in a nitrogen gas atmosphere, whereby the fine particles were subjected to carbonization treatment. Under an argon gas atmosphere in a continuous graphitization furnace, the fine particles were then heated to 2,800° C. in the course of 20 hours and, after maintained at the same temperature for 8 hours, were cooled to 100° C. in the course of 24 hours, whereby fine particles of boron-substituted graphite according to the present invention were obtained.

Those fine graphite particles contained 2.4 wt. % of elemental boron, and were fine particles of highly-crystalline boron-substituted graphite, in which the graphite layer spacing ($d_{002}$) was 0.335 nm, the size ($L_c$) of each crystallite in a direction of c-axis was 41 nm, and the size ($L_a$) of each crystallite in the direction of a-axis was 77 nm. Further, a boron $1_s$ spectrum as measured by XPS included around 186 eV a B $1_s$ peak ascribed to substituted solid-solution boron, and the percentage of boron determined from an intensity ratio of a B 1s peak appearing around 188 eV and ascribed to boron of $B_4C$ accounted for 0.92 atom % of surface layer elements as detected by XPS. When the binding energy of a gold $4f_{7/2}$ peak was assumed to be 84.0 eV, a carbon $1_s$ peak of graphite in a carbon $1_s$ spectrum as measured by XPS appeared around 284.1 eV. These physical property values are all presented together with measurement values of a battery in Table 1.

EXAMPLE 2

To vacuum residue pitch of 105° C. in softening point, boron carbide the average particle size of which was 8 μm was added in an amount of 2.5 wt. % in terms of boron. The resulting mixture was heat-treated in a similar manner as in Example 1, whereby high softening-point pitch containing 73 vol. % of optically isotropic structures and a softening point of 357° C. was obtained. The high softening-point pitch was pulverized into fine particles the average particle size of which was 18 μm, and the fine particles were subjected to similar oxidation treatment and carbonization treatment as in Example 1. Under an argon gas atmosphere in a continuous graphitization furnace, the fine particles were then heated to 2,400° C. in the course of 24 hours and, after maintained at the same temperature for 9 hours, were cooled from the temperature to 100° C. in the course of 36 hours, whereby fine particles of boron-substituted graphite according to the present invention were obtained. Various physical properties of those fine particles are presented in Table 1.

EXAMPLE 3

Vacuum residue pitch the softening point of which was 105° C. was heat-treated at 400° C. for 2 hours while bubbling 17 Nm³/pitch-kg of nitrogen gas at a pressure of 5 kg/cm².G. The treatment temperature was then lowered to 350° C., at which the pitch was heat-treated for 1 hour while bubling air at a similar flow rate. As a result, high softening-point pitch containing 23 vol. % of optically isotropic structures and a softening point of 273° C. was obtained. On the other hand, boric acid and natural graphite, the average particle size of which was 5 μm, were dissolved and dispersed in ethanol such that the content of boron in boric-acid-carrying natural graphite to be obtained finally would become 33 wt. %. The resulting mixture was then dried under reduced pressure to cause the ethanol to evaporate, so that fine particles of natural graphite with boric acid evenly carried thereon were obtained. To the high softening-point pitch, those fine particles were mixed in a proportion such that boron accounted for 5 wt. % based on the high softening-point pitch.

The resulting mixture of the high softening-point pitch and the natural graphite with boric acid carried thereon was kneaded in a kneader, and was then cooled and solidified. The mixture was pulverized into fine particles the average particle size of which was 18 μm, and the fine particles were subjected to similar oxidation treatment and carbonization treatment as in Example 1. Under an argon gas atmosphere with 10 vol. % of nitrogen gas in a continuous graphitization furnace, the fine particles were then heated to 2,800° C. in the course of 30 hours and, after maintained at the same temperature for 5 hours, were cooled from the temperature to 100° C. in the course of 24 hours, whereby fine particles of boron-substituted graphite according to the present invention were obtained. Various physical properties of those fine particles are presented in Table 1.

EXAMPLE 4

Using the fine particles of Example 3 before the oxidation treatment, oxidation treatment and carbonization treatment were conducted as in Example 1. Under a helium gas atmosphere in a continuous graphitization furnace, the fine particles were then heated to 2,800° C. in the course of 18 hours and, after maintained at the same temperature for 7 hours, were cooled from the temperature to 100° C. in the course of 30 hours, whereby fine particles of boron-substituted graphite according to the present invention were obtained. Various physical properties of those fine particles are presented in Table 1.

EXAMPLE 5

To fine particles which had been processed up to oxidation treatment as in Example 1, natural graphite the average particle size was 3 μm was added and mixed such that the proportion of the natural graphite would account for 5 wt. % of the resulting mixture. The mixture so obtained was subjected to carbonization and graphitization as in Example 1, whereby fine particles of boron-substituted graphite were obtained without fused cohesion of particles. Various physical properties of those fine particles are presented in Table 1.

EXAMPLE 6

Vacuum residue pitch of 105° C. in softening point was heat-treated at 400° C. for 5 hours while bubbling 17 Nm³/pitch-kg of nitrogen gas at a pressure of 5 kg/cm².G, whereby high softening-point pitch containing 80 vol. % of optically isotropic structures and a softening point of 360° C. was obtained. The pitch was drawn off from the reactor and was then cooled and solidified. The high softening-point pitch was pulverized into fine particles the average particle size of which was 23 µm. The fine particles were heated in an air stream at a ramp-up rate of 2° C./min from 130° C. to 260° C., at which the fine particles were maintained for 20 minutes to conduct oxidation treatment.

The fine particles were then heated to 800° C. at a ramp-up rate of 50° C./hr in the course of 24 hours in a nitrogen gas atmosphere, whereby the fine particles were subjected to carbonization treatment. In an Acheson furnace, graphitization treatment was then conducted to obtain fine graphite particles. To the fine graphite particles, amorphous silicon of 16 µm in average particle size was added such that the amorphous. silicon would account for 5 wt. % in terms of silicon of the whole mixture. The mixture so obtained was placed in a crucible and then heat-treated at 1,000° C. under a nitrogen gas stream, whereby a silicon-containing carbonaceous material according to the present invention was obtained. The results of a cyclic charge/discharge test of those fine particles are presented in Table 2.

EXAMPLE 7

To natural graphite which had been subjected to deashing treatment and had an average particle size of 16 µm, silicon oxide of 5 µm in average particle size was added such that the silicon oxide would account for 8 wt. % in terms of silicon of the whole mixture. The mixture so obtained was placed in a crucible and then heat-treated at 700° C. under an air atmosphere, whereby a silicon-containing carbonaceous material according to the present invention was obtained. The results of a cyclic charge/discharge test of those fine particles are presented in Table 2.

EXAMPLE 8

To the boron-substituted graphite produced in Example 1, monocrystalline silicon of 14 µm in average particle size was added such that the silicon would account for 5 wt. % in terms of silicon element of the whole mixture. The mixture so obtained was placed in a crucible and then heat-treated at 800° C. under a nitrogen gas stream, whereby a silicon-containing carbonaceous material according to the present invention was obtained. The results of a cyclic charge/discharge test of those fine particles are presented in Table 2.

Comparative Example 1

Mesophase pitch which had a softening point of 290° C. and was 100% formed of optically anisotropic structures was softened and molten. After adding boron oxide in an amount of 3 wt. % in terms of boron element to the molten pitch, the resulting mixture was cooled and solidified. The pitch so cooled and solidified was pulverized into fine particles of 16 µm in average particle size. The fine particles were heated in an air stream at a ramp-up rate of 2° C./min from 130° C. to 290° C., at which the fine particles were maintained for 20 minutes to conduct oxidation treatment. The fine particles so obtained were subjected to carbonization treatment and graphitization treatment as in Example 1, whereby fine carbonaceous particles of a comparative example were obtained. Various physical properties of those fine particles are presented in Table 1.

Comparative Example 2

Fine particles the average particle size of which was 20 µm were prepared in a similar manner as in Example 3 except that boric acid was added to high softening-point pitch in a proportion of 10 wt. % in terms of boron. The fine particles so obtained were subjected to carbonization treatment and graphitization treatment as in Example 3, whereby fine carbonaceous particles of a comparative example were obtained. Various physical properties of those fine particles are presented in Table 1.

Comparative Example 3

Fine carbonaceous particles of a comparative example were obtained by conducting treatments as in Example 1 except that the cooling rate at the time of graphitization was made slower and the time in the course of which the temperature was lowered to 100° C. was set at 120 hours. Various physical properties of those fine particles are presented in Table 1.

Comparative Example 4

Fine carbonaceous particles of a comparative example were obtained by conducting treatments as in Example 1 except that the treatments in the Acheson furnace were conducted for 20 hours, including the treatment time until cooled, with the graphitization temperature being set at 3,000° C. Various physical properties of those fine particles are presented in Table 1. According to a measurement of those fine particles by XPS, the remaining boron was wholly in B-N form.

Comparative Example 5

To the boron-substituted graphite produced in Example 1, monocrystalline silicon of 14 µm in average particle size was added such that the silicon would account for 5 wt. % in terms of silicon element of the whole mixture. The mixture so obtained was placed in a crucible and then heat-treated at 1,800° C. under a nitrogen gas stream, whereby a silicon-containing carbonaceous material of a comparative example was obtained. The results of a cyclic charge/discharge test of that material are presented in Table 2.

Evaluation as Electrode Materials

An electrode was prepared by thoroughly kneading 95 wt. % of the boron-substituted fine graphite particles obtained in Example 1 with 5 wt. % of a binder (polytetrafluoroethylene: 33 wt. %, acetylene black: 66 wt. %, surfactant: 1 wt. %), forming the resulting mass into pellets of 13 mm in diameter, holding the pellets between nickel nets, compression-bonding under a pressure of 3.8 t/cm$^2$ the nickel nets with the pellets held therebetween, and then drying the compression-bonded preform at 150° C. for 5 hours in a vacuum. Using the electrode, a lithium foil as a counter electrode, and a 1 mol/L solution of lithium perchlorate in an equimolar mixed solvent of ethylene carbonate and diethylene carbonate as an electrolytic solution, a lithium-ion secondary battery was prepared. Under constant-current charge/discharge at a current density of 0.1 mA/cm$^2$, the service capacity of the battery was measured. In a similar manner as described above, the boron-substituted fine graphite particles obtained in Examples 2–5, the silicon-containing carbonaceous materials obtained in Examples 6–8, the fine carbonaceous particles obtained in Comparative Examples 1–4 and the silicon-containing carbonaceous material obtained in Comparative Example 5 were also evaluated. The evaluation results are presented below in Table 1 and Table 2. It is appreciated from Table 1 and Table 2 that the boron-substituted fine graphite particles and silicon-containing carbonaceous materials according to the present invention have small irreversible capacity and high service capacity. Concerning cycling characteristic, those boron-substituted graphites showed very small property changes as low as only about 5% and hence had good cycling characteristic.

TABLE 1

Property/characteristic/B amount

| Graphite | Charge capacity (mAh/g) | Discharge capacity (mAh/g) | Initial efficiency (%) | Discharge capacity at 10th cycle (mAh/g) | Amount of added B (%) | $d_{002}$ (nm) | $L_c$ (nm) | $L_a$ (nm) | Solid-solution B peak in XPS | $B_4C$ content determined by XPS (at. %) | BN content determined by XPS (at. %) | Bonding energy of C 1s peak (eV) |
|---|---|---|---|---|---|---|---|---|---|---|---|---|
| Example 1 | 387 | 351 | 90.7 | 337 | 2.4 | 0.335 | 41 | 77 | Appeared | 0.92 | 3.10 | 284.1 |
| Example 2 | 391 | 353 | 90.3 | 332 | 2.1 | 0.336 | 37 | 57 | Appeared | 0.38 | 0.73 | 284.2 |
| Example 3 | 381 | 344 | 90.3 | 330 | 2.8 | 0.335 | 47 | 82 | Appeared | 1.31 | 1.32 | 284.1 |
| Example 4 | 383 | 347 | 90.6 | 344 | 2.5 | 0.335 | 51 | 73 | Appeared | 1.52 | 0 | 284.0 |
| Example 5 | 385 | 349 | 90.6 | 331 | 2.2 | 0.335 | 49 | 90 | Appeared | 0.97 | 1.45 | 284.1 |
| Comp. Ex. 1 | 401 | 331 | 82.5 | 311 | 2.1 | 0.337 | 32 | 50 | Appeared | 1.12 | 0.93 | 264.1 |
| Comp. Ex. 2 | 420 | 317 | 75.5 | 295 | 8.6 | 0.335 | 48 | 67 | Appeared | 1.71 | 2.22 | 284.1 |
| Comp. Ex. 3 | 410 | 321 | 78.3 | 299 | 1.7 | 0.336 | 35 | 61 | Appeared | 10.51 | 1.20 | 284.2 |
| Comp. Ex. 4 | 387 | 297 | 76.7 | 276 | 0.3 | 0.338 | 27 | 38 | Not appeared | 0 | 13.76 | 284.3 |

TABLE 2

Property/characteristic/Si amount

| Graphite | Charge capacity (mAh/g) | Discharge capacity (mAh/g) | Initial efficiency (%) | Amount of added silicon (%) |
|---|---|---|---|---|
| Example 6 | 376 | 338 | 90.0 | 5 |
| Example 7 | 485 | 412 | 84.9 | 8 |
| Example 8 | 455 | 403 | 88.6 | 5 |
| Comp. Ex. 5 | 427 | 319 | 74.7 | 5 |

What is claimed is:

1. A process for producing a boron-substituted graphite, the boron-substituted graphite containing nitrogen-bonded boron atoms, the nitrogen-bonded boron atoms being present in an amount of 10 atom % or less of surface layer elements relative to whole-substituted boron atoms, which process comprises the steps of:
    a) heating a feed fine particulate mixture of an infusibilized carbonaceous material and a boron compound, whereby the carbonaceous material is carbonized into a carbon structure;
    b) raising a temperature of the resulting heated fine particulate mixture to a graphitization treatment temperature in an inert atmosphere which is unreactive with boron;
    c) retaining said graphitization treatment temperature for a time sufficient to allow graphitization of the carbon structure to proceed to a desired extent; and
    d) cooling the resulting graphitized mixture to a temperature of 100° C. in not more than 100 hours.

2. The process of claim 1, wherein said inert atmosphere unreactive with boron comprises helium, argon, or helium or argon with nitrogen contained therein to an extent not causing boron nitrification.

3. The process of claim 1, wherein said carbonaceous material is a high softening-point pitch comprising 5 to 98 vol. % of optically isotropic portions.

4. The process of claim 3, wherein said feed fine particulate mixture comprises said high softening-point pitch and said boron compound in a proportion of from 0.1% to 7 wt. % in terms of boron based on the high softening-point pitch.

5. The process of claim 4, wherein in said feed fine particulate mixture, the boron compound is in a form evenly dusted on surfaces of fine particles of highly-crystalline graphite.

6. The process of claim 1, wherein said graphitization treatment temperature is at least 2200° C., the temperature of said heated fine particulate mixture being raised to said graphitization temperature in 100 hours.

7. The process of claim 5, wherein said highly cyrstalline graphite is natural, flaky graphite or artificial graphite having an average particle size of from 0.1 to 10 µm.

8. The process of claim 3, wherein the high softening point pitch has a softening point of from 110 to 115° C.

9. The process of claim 1, further comprising adding highly-crystalline graphite in a form of fine powder to the feed fine particulate mixture or the heated fine particulate mixture such that the highly crystalline graphite amounts to 0.5 to 30 wt. % of the whole resulting mixture.

10. The process of claim 1, wherein said boron compound comprises elemental boron, an inorganic boron compound or organic boron compound.

11. The process of claim 10, wherein the boron compound is an inorganic boron compound comprising boric acid, boron oxide or boron carbide.

12. The process of claim 1, wherein said feed fine particulate mixture comprises particles having an average particle size of 50 µm or smaller.

13. The process of claim 4, wherein the proportion of the boron compound is from 1 to 5 wt. %.

14. The process of claim 1, wherein said heating in step a) is effected at 420° C. or lower.

15. The process of claim 14, wherein said heating is effected at 380 to 400° C.

16. The process of claim 1, wherein the graphitization temperature of step c) is retained for up to 48 hours.

17. The process of claim 16, wherein said graphitization temperature is retained for 1 to 12 hours.

18. The process of claim 1, wherein said produced boron substituted graphite is a highly-crystalline boron-substituted graphite having a graphite layer spacing ($d_{002}$) of 0.337 nm or smaller, a crystallite size ($L_c$) of 30 nm or greater in the direction of c-axis, and a crystallize size ($L_a$) of 40 nm or greater in the direction of a-axis.

19. A process for the production of boron-substituted graphite, which comprises the following steps:
  (a) adding and mixing a boron compound with a carbonaceous material, and heat-treating the resulting mixture;
  (b) pulverizing said heat-treated mixture into fine particles;
  (c) infusibilizing said fine particles by oxidation treatment;
  (d) heating said infusibilized fine particles such that said carbonaceous material is carbonized into a carbon structure; and
  (e) subjecting said heated fine particles to graphitization treatment such that said carbon structure is graphitized; wherein
    in step (a), said carbonaceous material is pitch having a softening point of from 100 to 115° C., said boron compound is added and mixed in a proportion of from 0.1 to 7 wt. % in terms of boron element with said pitch, and the resulting mixture is heat-treated to at least 420° C. such that said pitch is converted into high softening-point pitch comprising 5 to 98 vol. % of optically isotropic portions and having a softening point of at least 250° C.,
    in step (b), said fine particles have an average particle size of at most 50 μm,
    in step (c), said oxidation treatment is conducted under conditions such that said oxidation-treated particles contain 2 to 10 wt. % of oxygen,
    in step (d), said heating is conducted at 600 to 1,200° C.,
    in step (e), a temperature of said heated infusibilized fine particles is raised in 100 hours to said graphitization treatment temperature, said graphitization treatment is conducted at at least 2,200° C. for 1 to 12 hours, and said graphitized fine particles are quickly cooled to 100° C. from said graphitization treatment temperature in 100 hours after said graphitization treatment.

20. The process of claim 19, wherein in step (a), said boron compound is in a form evenly dusted on surfaces of fine particles of highly-crystalline graphite.

21. The process of claim 19, wherein said pulverizing of step b) is such that resulting particles have an average particle size of 50 μm.

22. The process of claim 21, wherein said resulting particles have an average particle size of 5 to 30 μm.

23. Boron-substituted graphite, which is produced by the process of claim 1, wherein a graphite intercalation spacing ($d_{002}$) is at most 0.337 nm as measured by X-ray diffraction, each crystallite has a size ($L_c$) of at least 30 nm in a direction of c-axis, each crystallite has a size ($L_a$) of at least 40 nm in a direction of a-axis, a boron 1s spectrum as measured by XPS (X-ray photoelectron spectroscopy) includes at around 186 eV a B 1s peak ascribed to substituted solid-solution boron, and a percentage of boron determined from an intensity ratio of a B 1s peak appearing around 188 eV and ascribed to boron of $B_4C$ accounts for at most 5 atom % of surface layer elements as detected by XPS.

24. The boron-substituted graphite of claim 23, wherein said nitrogen-bonded boron exhibits a peak which appears at around 190 eV as measured by XPS.

25. The boron-substituted graphite of claim 23, wherein, when binding energy of a gold $4f_{7/2}$ peak is assumed to be 84.0 eV, a carbon 1s peak of graphite in a carbon 1s spectrum as measured by XPS is smaller in binding energy than 284.3 eV and appears around 282.5 eV.

26. The boron-substituted graphite of claim 23, wherein elemental boron is contained in a proportion of from 0.01 to 5 wt. % based on the whole boron-substituted graphite.

27. The boron-substituted graphite of claim 25, wherein elemental boron is contained in a proportion of from 0.5 to 3 wt. %.

28. The boron-substituted graphite of claim 23, having a specific surface area of 2.0 $m^2/g$ or smaller.

29. The boron-substituted graphite of claim 23, having particle sizes in a range of from 1 to 100 μm.

30. The boron-substituted graphite of claim 29, having particle sizes in a range of from 5 to 40 μm.

31. The boron-substituted graphite of claim 30, having particle sizes in a range of from 10 to 25 μm.

32. A negative-electrode active material, comprising the boron-substituted graphite of claim 23, and a binder.

33. A negative electrode, which is produced by the steps of:
  a) coating the negative-electrode active material of claim 32, or a charge collector; and
  b) drying the coated charge collector, thereby forming the negative electrode.

34. A lithium-ion secondary battery, comprising:
  a) a positive electrode; and
  b) the negative-electrode of claim 33.

* * * * *